United States Patent
Tada et al.

(10) Patent No.: US 11,651,922 B2
(45) Date of Patent: May 16, 2023

(54) CONNECTOR WITH INTEGRATED THERMAL CUTOFF DEVICE FOR BATTERY PACK

(71) Applicant: BOURNS, INC., Riverside, CA (US)

(72) Inventors: Kiyoshi Tada, Yokohama (JP); Cathal Sheehan, Cork City (IE); Brian Ahearne, Cork City (IE); Gordon Lee Bourns, Riverside, CA (US)

(73) Assignee: Bourns, Inc., Riverside, CA (US)

( * ) Notice: Subject to any disclaimer, the term of this patent is extended or adjusted under 35 U.S.C. 154(b) by 141 days.

(21) Appl. No.: 17/003,613

(22) Filed: Aug. 26, 2020

(65) Prior Publication Data

US 2021/0066016 A1 Mar. 4, 2021

Related U.S. Application Data

(60) Provisional application No. 62/892,484, filed on Aug. 27, 2019.

(51) Int. Cl.
*H01H 85/02* (2006.01)
*H01R 13/66* (2006.01)
(Continued)

(52) U.S. Cl.
CPC .......... *H01H 85/0241* (2013.01); *H01C 7/02* (2013.01); *H01H 71/16* (2013.01); *H01H 71/50* (2013.01);
(Continued)

(58) Field of Classification Search
None
See application file for complete search history.

(56) References Cited

U.S. PATENT DOCUMENTS

| 3,361,888 A | 1/1968 | Brackett |
| 3,840,834 A | 10/1974 | Obenhaus et al. |

(Continued)

FOREIGN PATENT DOCUMENTS

| CN | 1497766 A | 5/2004 |
| CN | 101479865 A | 7/2009 |

(Continued)

OTHER PUBLICATIONS

International Search Report and Written Opinion dated May 5, 2017 in International Application No. PCT/US16/66985, 15 pages.

(Continued)

*Primary Examiner* — Arun C Williams
(74) *Attorney, Agent, or Firm* — Knobbe, Martens, Olson & Bear LLP

(57) ABSTRACT

A temperature-sensitive battery connector is disclosed. The connector can include a connector body and at least one conductor mounted to the connector body and configured to convey a current signal used to measure voltage from a battery pack or battery cell to a battery management system (BMS). The connector can include a thermal switching device mounted to the connector body and thermally coupled to a terminal of a battery pack or a battery cell. The thermal switching device can be configured to provide an overtemperature signal to the BMS by changing or interrupting a current conducted by at least one conductor when a temperature of the battery pack or battery cell exceeds a threshold temperature.

26 Claims, 11 Drawing Sheets

(51) Int. Cl.

| | | |
|---|---|---|
| H01R 13/68 | (2011.01) | |
| H01R 13/713 | (2006.01) | |
| H01C 7/02 | (2006.01) | |
| H01H 71/50 | (2006.01) | |
| H01H 71/16 | (2006.01) | |
| H02J 7/00 | (2006.01) | |
| H01M 10/42 | (2006.01) | |
| H01M 10/48 | (2006.01) | |
| H01M 10/44 | (2006.01) | |
| H01M 50/581 | (2021.01) | |

(52) U.S. Cl.
CPC ..... *H01M 10/425* (2013.01); *H01M 10/4207* (2013.01); *H01M 10/441* (2013.01); *H01M 10/443* (2013.01); *H01M 10/482* (2013.01); *H01M 10/486* (2013.01); *H01M 50/581* (2021.01); *H01R 13/6683* (2013.01); *H01R 13/6691* (2013.01); *H01R 13/68* (2013.01); *H01R 13/7137* (2013.01); *H02J 7/0014* (2013.01); *H01H 2085/025* (2013.01); *H01M 2010/4271* (2013.01); *H01M 2200/103* (2013.01)

(56) References Cited

U.S. PATENT DOCUMENTS

| 4,000,445 | A | 12/1976 | Wilson |
|---|---|---|---|
| 4,518,943 | A | 5/1985 | Giessner |
| 5,104,754 | A | 4/1992 | Dorinski et al. |
| 5,337,036 | A | 8/1994 | Kuczynski |
| 5,459,388 | A | 10/1995 | Illingworth et al. |
| 5,666,254 | A | 9/1997 | Thomas et al. |
| 5,689,173 | A | 11/1997 | Oosaki et al. |
| 5,864,458 | A | 1/1999 | Duffy et al. |
| 5,886,860 | A | 3/1999 | Chen et al. |
| 5,995,392 | A | 11/1999 | Turner |
| 6,128,168 | A | 10/2000 | Armold et al. |
| 6,265,961 | B1 | 7/2001 | Takeda |
| 6,346,796 | B1 | 2/2002 | Takeda |
| 6,469,600 | B1 | 10/2002 | Seese et al. |
| 6,503,647 | B1 | 1/2003 | Sugiyama et al. |
| 6,633,222 | B2 | 10/2003 | Nagai et al. |
| 6,756,876 | B2 | 6/2004 | Sullivan et al. |
| 6,801,116 | B2 | 10/2004 | Oh et al. |
| 6,861,930 | B2 | 3/2005 | Simms et al. |
| 7,113,381 | B2 | 9/2006 | Francis |
| 7,205,067 | B2 | 4/2007 | Godevais et al. |
| 7,354,677 | B2 | 4/2008 | Yoshizawa et al. |
| 7,446,643 | B2 | 11/2008 | Lee et al. |
| 7,618,724 | B2 | 11/2009 | Kim et al. |
| 8,958,196 | B2 | 2/2015 | Takeda |
| 9,350,053 | B2 | 5/2016 | Feuerstack et al. |
| 9,923,362 | B2 | 3/2018 | Hasunuma et al. |
| 9,960,545 | B2 | 5/2018 | Golubovic et al. |
| 10,439,196 | B2 | 10/2019 | Bourns et al. |
| 10,707,475 | B2 | 7/2020 | Bourns et al. |
| 10,985,552 | B2 | 4/2021 | Tada et al. |
| 2001/0001533 | A1* | 5/2001 | Stuck Andersen ........................ H02J 7/007194 320/150 |
| 2002/0140401 | A1 | 10/2002 | Watanabe et al. |
| 2003/0107347 | A1* | 6/2003 | Yoshizawa .............. H02J 7/045 320/161 |
| 2004/0065536 | A1 | 4/2004 | Takiagwa |
| 2004/0189245 | A1 | 9/2004 | Teraoka et al. |
| 2004/0212350 | A1 | 10/2004 | Patino et al. |
| 2005/0057336 | A1 | 3/2005 | Toyosaki et al. |
| 2006/0017738 | A1 | 1/2006 | Bystricky et al. |
| 2006/0109074 | A1 | 5/2006 | Lee et al. |
| 2006/0158156 | A1 | 7/2006 | Gamboa |
| 2009/0253028 | A1 | 10/2009 | Takagi |
| 2009/0315731 | A1 | 12/2009 | Meisel et al. |
| 2010/0047674 | A1 | 2/2010 | Ryu et al. |
| 2010/0165526 | A1 | 7/2010 | Dishman et al. |
| 2011/0043321 | A1 | 2/2011 | Takeda |
| 2011/0293997 | A1 | 12/2011 | Tartaglia |
| 2012/0212210 | A1 | 8/2012 | Takeda |
| 2013/0136964 | A1 | 5/2013 | Li et al. |
| 2013/0323547 | A1 | 12/2013 | Namikawa |
| 2014/0078632 | A1 | 3/2014 | Jung |
| 2014/0103880 | A1 | 4/2014 | Schaefer et al. |
| 2014/0285936 | A1 | 9/2014 | Garbacik et al. |
| 2015/0037626 | A1 | 2/2015 | Malcolm et al. |
| 2015/0188204 | A1 | 7/2015 | Hanada |
| 2015/0229011 | A1 | 8/2015 | Gless |
| 2015/0244165 | A1 | 8/2015 | Roesner et al. |
| 2015/0288025 | A1 | 10/2015 | Hwang et al. |
| 2015/0291019 | A1 | 10/2015 | Hatta et al. |
| 2016/0254522 | A1 | 9/2016 | Johler et al. |
| 2017/0005377 | A1 | 1/2017 | Rong |
| 2017/0033576 | A1 | 2/2017 | Qu |
| 2017/0179462 | A1 | 6/2017 | Bourns et al. |
| 2017/0179713 | A1* | 6/2017 | Bourns ............... H01M 50/581 |
| 2018/0026315 | A1 | 1/2018 | Hinterberger et al. |
| 2019/0030983 | A1 | 1/2019 | Miller et al. |
| 2019/0393696 | A1 | 12/2019 | Tada et al. |

FOREIGN PATENT DOCUMENTS

| CN | 201315331 Y | 9/2009 |
|---|---|---|
| CN | 103985598 A | 8/2014 |
| CN | 206211588 U | 5/2017 |
| CN | 112335118 A | 2/2021 |
| CN | 114600311 A | 6/2022 |
| DE | 10 2014 215 550 A1 | 2/2016 |
| EP | 0 198 707 A2 | 10/1986 |
| EP | 2 456 003 A1 | 5/2012 |
| EP | 2 541 576 A1 | 1/2013 |
| EP | 3 391 435 A1 | 5/2022 |
| JP | 2005-203277 | 7/2005 |
| JP | 2006-156064 | 6/2006 |
| JP | 2007-043800 | 2/2007 |
| JP | 2011-198645 | 10/2011 |
| JP | 2011-249322 | 12/2011 |
| JP | 2012-059369 | 3/2012 |
| JP | 2012-084548 | 4/2012 |
| JP | 4980495 | 7/2012 |
| JP | 2012-160317 | 8/2012 |
| JP | 2012-160375 | 8/2012 |
| JP | 2012-174615 | 9/2012 |
| JP | 2012-238615 | 12/2012 |
| JP | 2013-016510 | 1/2013 |
| JP | 2013-020771 | 1/2013 |
| JP | 2013-020864 | 1/2013 |
| JP | 2013-041798 | 2/2013 |
| JP | 5148023 | 2/2013 |
| JP | 2013-062256 | 4/2013 |
| JP | 2013-093143 | 5/2013 |
| JP | 2013-098096 | 5/2013 |
| JP | 2013-110032 | 6/2013 |
| JP | 2013-110034 | 6/2013 |
| JP | 2013-127870 | 6/2013 |
| JP | 2013-140819 | 7/2013 |
| JP | 2013-149632 | 8/2013 |
| JP | 2013-161683 | 8/2013 |
| JP | 2013-161763 | 8/2013 |
| JP | 2013-171642 | 9/2013 |
| JP | 2013-186953 | 9/2013 |
| JP | 2013-222533 | 10/2013 |
| JP | 2017-139104 | 8/2017 |
| WO | WO 2005/124807 A1 | 12/2005 |
| WO | WO 2006/086156 A2 | 8/2006 |
| WO | WO 2008/002487 A2 | 1/2008 |
| WO | WO 2012/094385 A2 | 7/2012 |
| WO | WO 2012/169442 A1 | 12/2012 |
| WO | WO 2013/054927 A1 | 4/2013 |
| WO | WO 2013/094725 A1 | 6/2013 |
| WO | WO 2014/177874 A2 | 11/2014 |
| WO | WO 2014/189363 A1 | 11/2014 |
| WO | WO 2015/157106 A1 | 10/2015 |
| WO | WO 2016/000492 A1 | 1/2016 |
| WO | WO 2017/106535 A1 | 6/2017 |

(56) References Cited

FOREIGN PATENT DOCUMENTS

| WO | WO 2017/198599 A1 | 11/2017 |
| WO | WO 2019/246414 A1 | 12/2019 |
| WO | WO 2021/041554 A2 | 3/2021 |

OTHER PUBLICATIONS

International Search Report and Written Opinion dated Sep. 13, 2019 in International Application No. PCT/U2019/038274, 16 pages.

Ji, Yan et al., "Heating strategies for Li-ion batteries operated from subzero temperatures," Electrochimica Acta, 2013, vol. 107, pp. 664-674.

Supplemental European Search Report, completed Jun. 26, 2019, for European Appl. No. EP 16 87 6703, 6 pages.

Chinese Office Action, First Notification of Office Action, dated Aug. 20, 2020, in China Application No. 2016800821570, with English translation, 17 pages.

International Preliminary Report on Patentability dated Jul. 27, 2020, in International Application No. PCT/US2019/038274, 19 pages.

International Search Report dated Nov. 13, 2020 in International Application No. PCT/US2020/48015, 2 pages.

Korean Office Action dated May 6, 2021 in Korean Application No. 10-2020-7034526, with English translation, 5 pages.

Office Action dated Aug. 8, 2018 for U.S. Appl. No. 15/379,193, 25 pages.

Extended European Search Report, dated Feb. 7, 2022, for European Appl. No. EP 19822949.4, 7 pages.

Chinese Office Action, Second Notification of Office Action, dated May 31, 2021, in China Application No. 2016800821570, with English translation, 14 pages.

Chinese Office Action, Third Office Action, dated Jan. 5, 2022, in China Application No. 2016800821570, with English translation, 15 pages.

\* cited by examiner

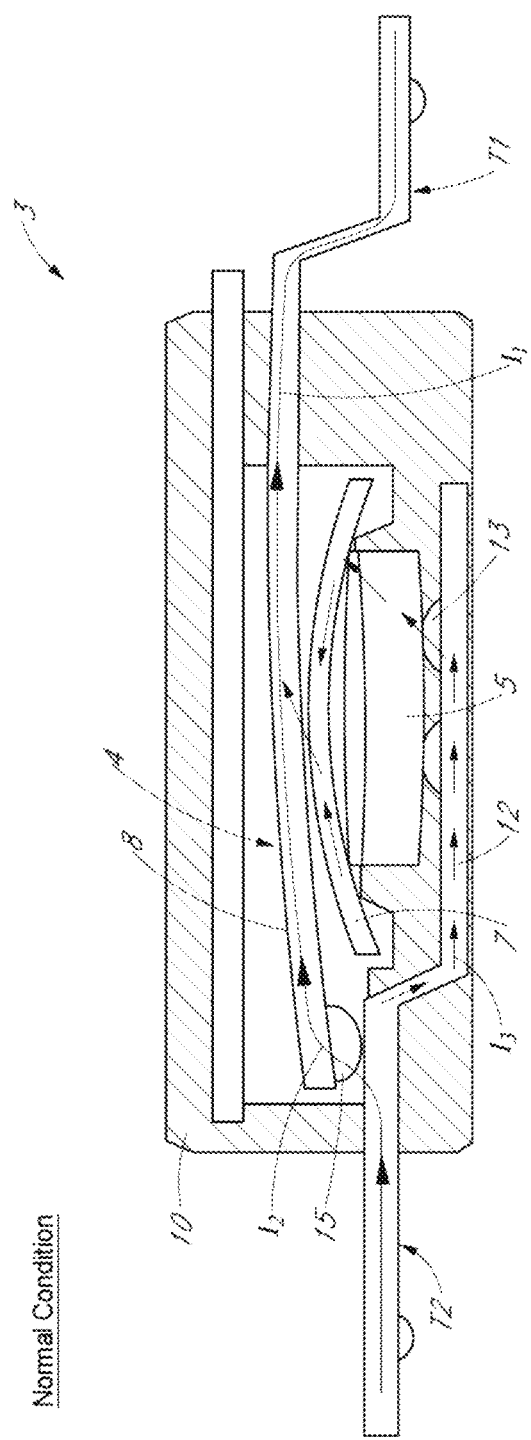
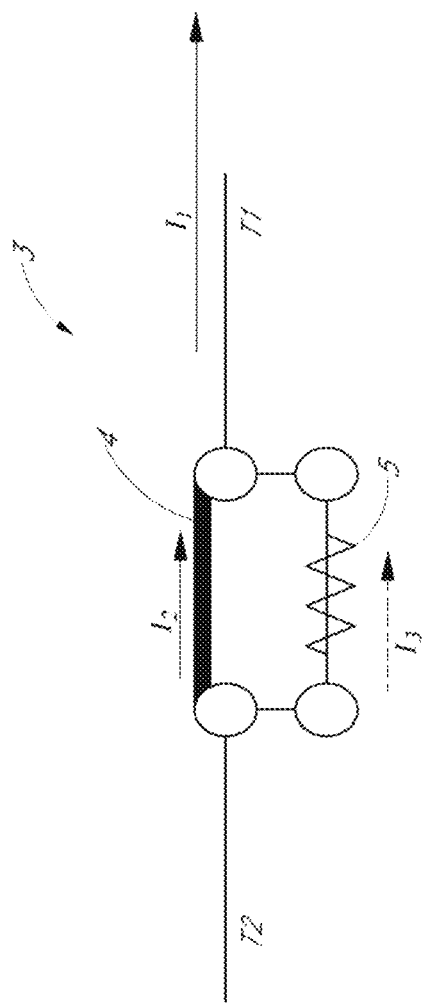

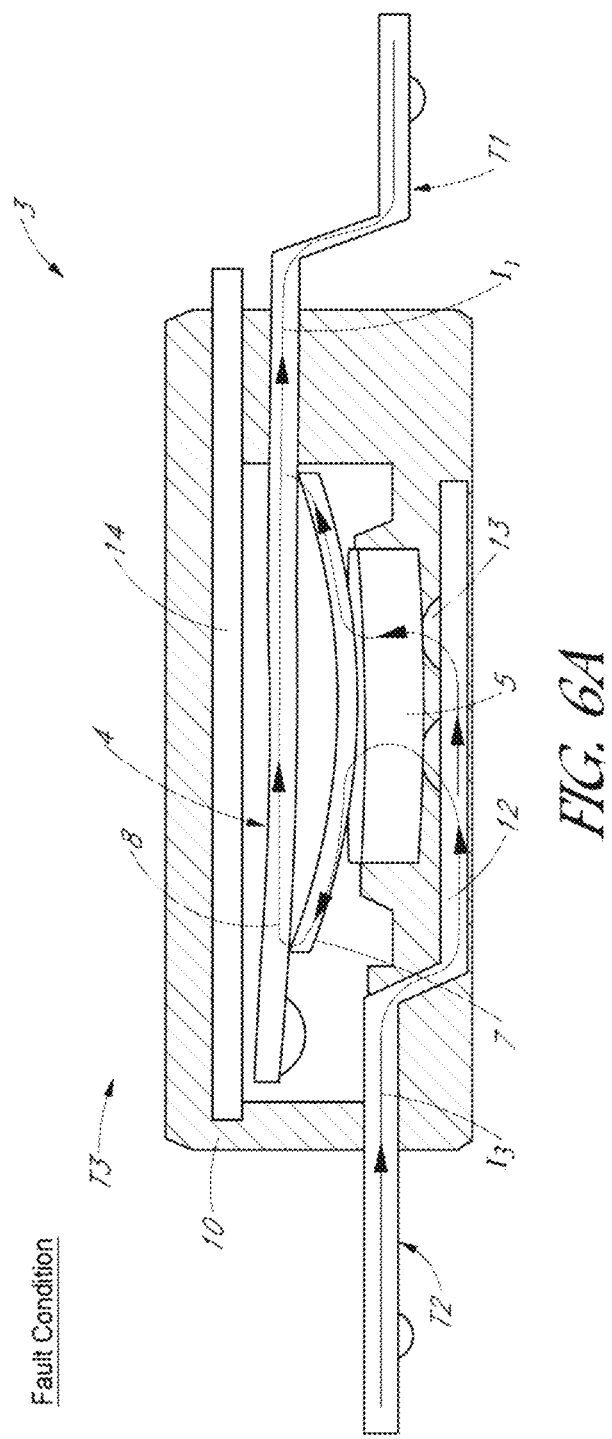
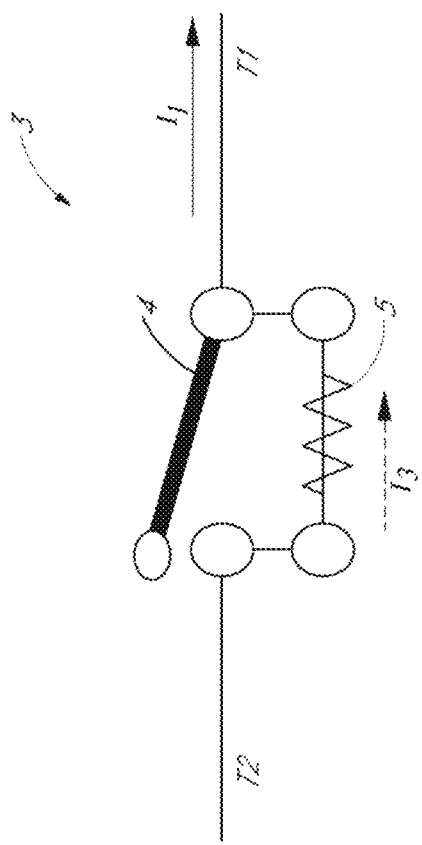
FIG. 6A
FIG. 6B

CONNECTOR WITH INTEGRATED THERMAL CUTOFF DEVICE FOR BATTERY PACK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The field relates to an integrated thermal cutoff device for sensing the temperature of a cell or battery pack.

Description of the Related Art

In various types of electrical systems, circuit elements such as batteries, which may comprise one or more cells, or other components may experience faults which negatively affect the operation or reliability of the larger electrical system. For example, during operation or charging, battery packs may experience an increase in temperature. If the temperature increases are excessive, then the cell or battery pack or the larger electrical system may be damaged in an overtemperature and/or overcurrent fault. Such overtemperature faults may reduce the functionality, reliability, lifetime, and/or safety of the device. Accordingly, there remains a continuing need for an apparatus that protects the larger electrical system when circuit elements (such as cells or batteries) experience overtemperature faults.

SUMMARY

In one embodiment, a temperature-sensitive battery connector is disclosed. The temperature-sensitive battery connector can include a connector body, and at least one conductor mounted to the connector body and configured to convey a signal from a battery pack or battery cell to an electrical device (such as a battery management system (BMS)). The temperature-sensitive battery connector can include a thermal switching device mounted to the connector body and thermally coupled to a terminal of a battery pack or a battery cell. The thermal switching device can be configured to provide an overtemperature signal to the electrical device by modifying the signal conveyed by the at least one conductor when a temperature of the battery pack or battery cell exceeds a predetermined threshold temperature.

In another embodiment, an electrical system is disclosed. The electrical system can include a plurality of battery packs and a battery management system (BMS) for managing the plurality of battery packs. Each battery pack of the plurality of battery packs can have at least one battery terminal. The BMS can include a battery management controller and a plurality of status lines. The battery management controller can be configured to monitor a status of the battery packs through the status lines. Each status line of the plurality of status lines can include a connector configured to couple to the battery terminal of a respective one of the battery packs. Each status line of the plurality of status lines can include at least one conductor mounted to the connector and coupling the connector to the battery management controller. Each status line of the plurality of status lines can include a thermal switching device mounted to the connector. The thermal switching device can be thermally coupled to the battery terminal of the respective one of the battery packs. The thermal switching device can modify a signal to the battery management controller from the battery terminal of the respective one of the battery packs when a temperature of the respective one of the battery packs exceeds a predetermined threshold temperature.

BRIEF DESCRIPTION OF THE DRAWINGS

Specific implementations of the invention will now be described with reference to the following drawings, which are provided by way of example, and not limitation.

FIG. 5A is a schematic side sectional view of a thermal switching device in a normal operating condition, according to various embodiments.

FIG. 5B is a schematic circuit diagram of the thermal switching device shown in FIG. 5A.

FIG. 6A is a schematic side sectional view of the thermal switching device of FIG. 5A in a fault condition.

FIG. 6B is a schematic circuit diagram of the thermal switching device shown in FIG. 6A.

DETAILED DESCRIPTION

Various embodiments disclosed herein relate to a connector with an integrated thermal switching device, for example, a thermal cutoff (TCO), configured to detect overtemperature and/or overcurrent conditions in a battery pack or battery cell, and to relay that detection to an electrical device such as a battery management system (BMS). In various embodiments, a temperature-sensitive battery connector is disclosed. The connector can include a connector body and at least one conductor mounted to the connector body and configured to convey a signal by which the temperature of a battery pack or battery cell is determined to have exceeded a threshold level by a battery management system (BMS). The connector can include a thermal switching device, for example a TCO, mounted to the connector body and thermally coupled to a terminal of a battery pack or a battery cell. The thermal switching device can be configured to provide an overtemperature signal to the BMS (or other type of electrical device) by interrupting a voltage or current to provide a signal to be conveyed by the at least one conductor used to balance one or more cells in a battery (or an array of cells) when a temperature of the battery pack or battery cell exceeds a threshold temperature. In various embodiments, for example, the signal conveyed to the BMS can be created by a change in resistance, e.g., a sudden increase in resistance of the thermal switching device or TCO in the connector body. The BMS can be configured to interpret the signal as an increase in battery pack or battery cell temperature and can transmit an alarm indicating an overtemperature condition. In various embodiments, the BMS can shut down one or more (or all) of the cells in response to the alarm. The threshold temperature can be tuned and set in advance for the device by selection of materials and dimensions of the thermal switching device.

Figure 1:
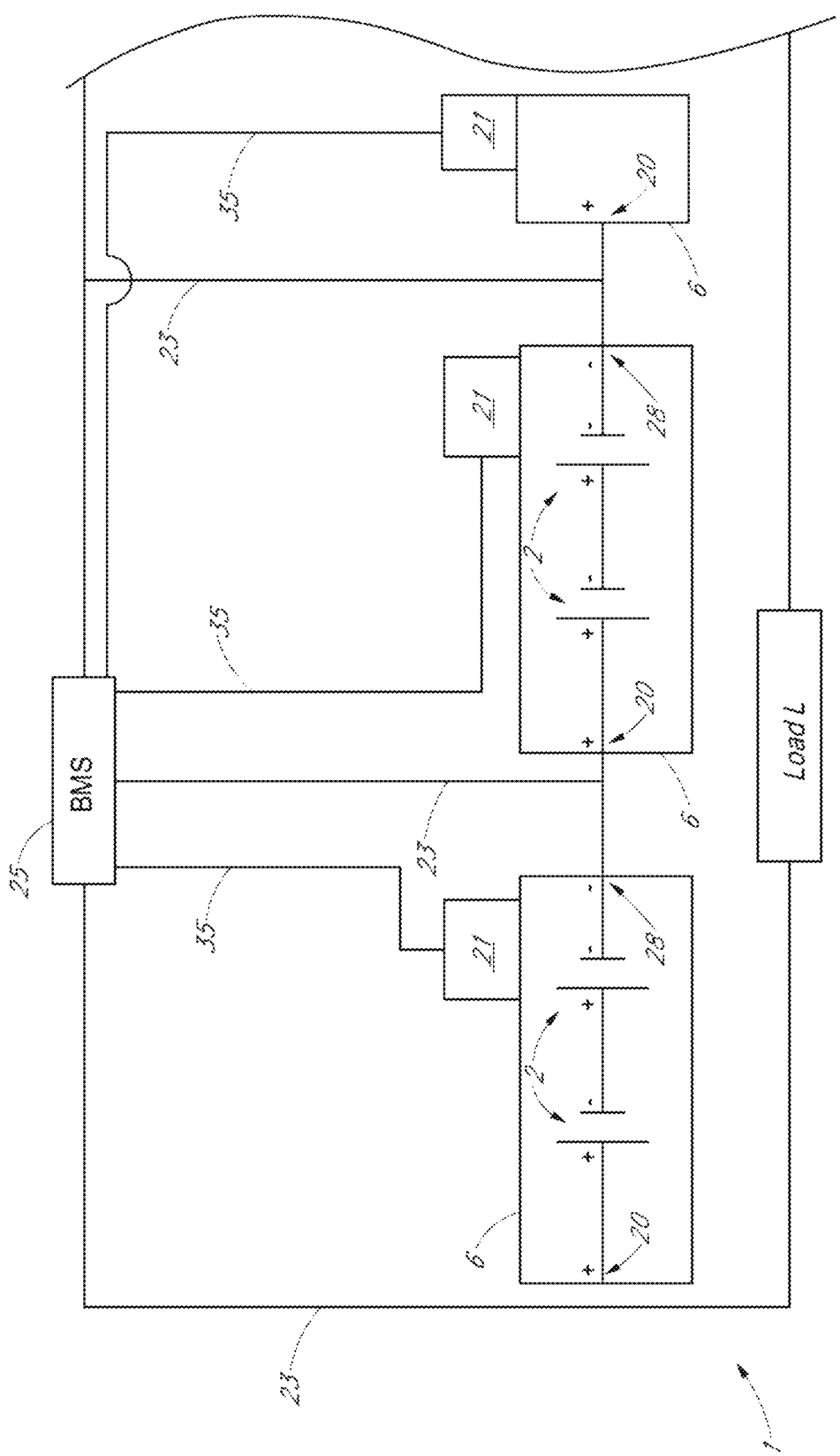
FIG. 1 is a schematic system diagram of a portion of an electrical system having one or more temperature sensors connected to corresponding battery packs.

FIG. 1 is a schematic system diagram of a portion of an electrical system 1 having one or more temperature sensors 21 attached to corresponding battery packs 6. The battery packs 6 can supply electrical power to a load L. Each battery pack 6 can include one or a plurality of battery cells 2. An electrical device comprising a battery management system 25 can connect to positive terminals 20 of the respective battery packs 6 by way of corresponding cell balancing lines, which are also used as cell voltage status signaling lines in various embodiments disclosed herein (also referred to as "status lines 23" herein). As shown, the positive terminal 20 of a particular battery pack 6 can connect to a negative terminal 28 of an adjacent battery pack 6. The BMS 25 can receive signals from the battery packs 6 along the status lines 23 that are indicative of the state of the battery pack 6 (e.g., a voltage status of the battery packs 6). For example, the approximate voltage of the battery pack 6 can be provided to the BMS 25 along the status line 23. In addition, as shown schematically in FIG. 1, a temperature sensor 21 (e.g., a thermistor) can be physically attached or mounted to a housing structure of the battery packs 6. The temperature sensor 21 can measure a temperature of the battery pack 6 to which it is connected, and can transmit the measured temperature (or a property associated and derivable from the measurement determined by the sensor 21) to the BMS 25 along a temperature sensing line 35. Based on the signal transmitted to the BMS 25 along the temperature sensing line 35, the BMS 25 can determine whether the battery packs 6 are experiencing overtemperature and/or overcurrent conditions.

Thus, in the arrangement shown in FIG. 1, the BMS 25 connects to the positive terminals 20 of each battery pack 6 by way of status lines 23, and monitors the temperature of each battery pack 6 by way of the temperature sensors 21 and temperature sensing lines 35. The use of multiple thermistors 21 and additional temperature sensing lines 35 can increase the cost and complexity of the electrical system 1. Furthermore, the temperature sensor 21 is typically mounted on the housings of the battery back 6, which may have a poor thermal conductivity, causing delays and inaccuracies in measuring the temperature of the cells 2 within the battery pack 6. Accordingly, there remains a continuing need for improved systems and methods for monitoring the temperatures of battery packs.

Figure 2A:
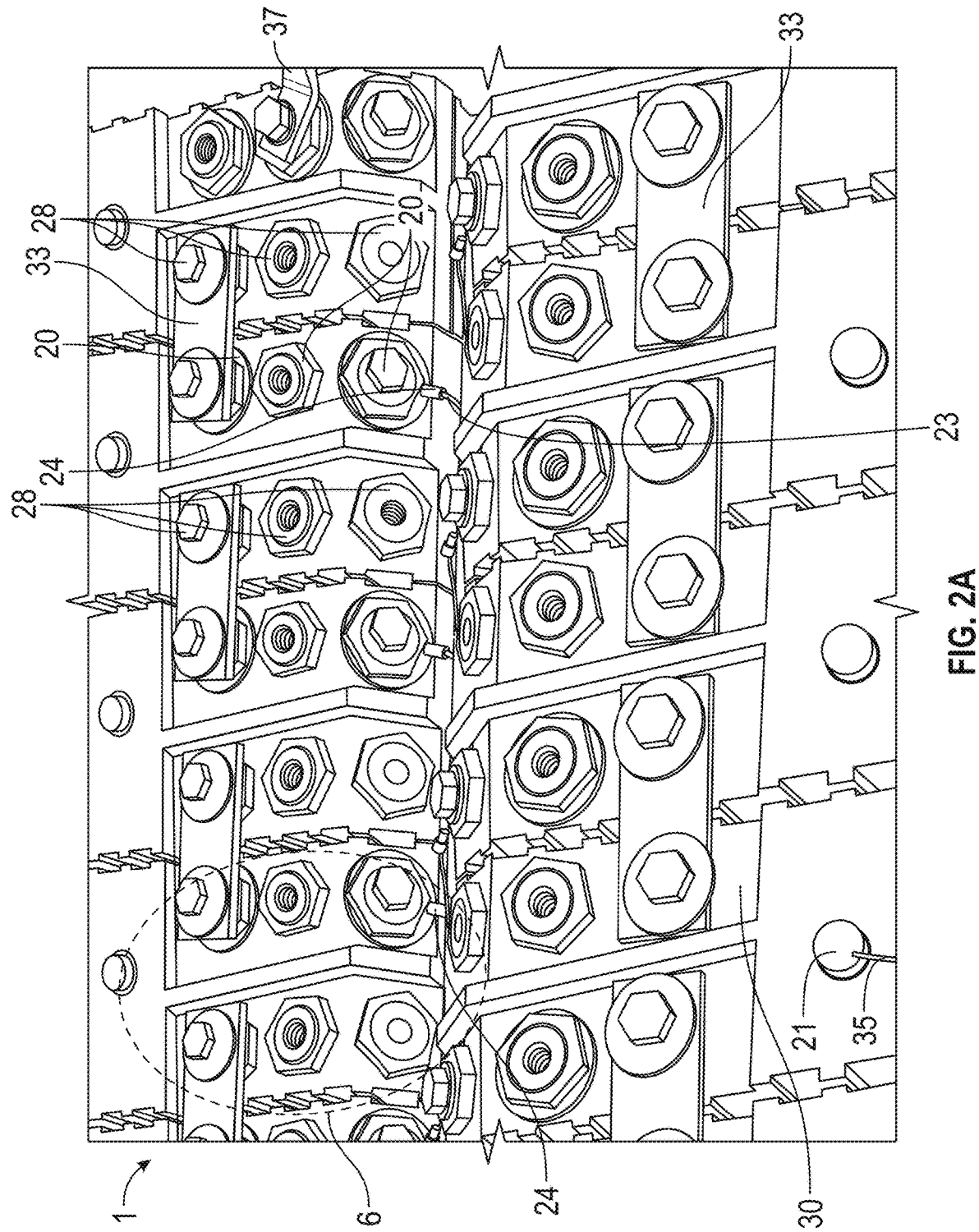
FIG. 2A is a perspective image of an electrical system that includes a plurality of interconnected battery packs to supply electrical power to a load.
Figure 2B:
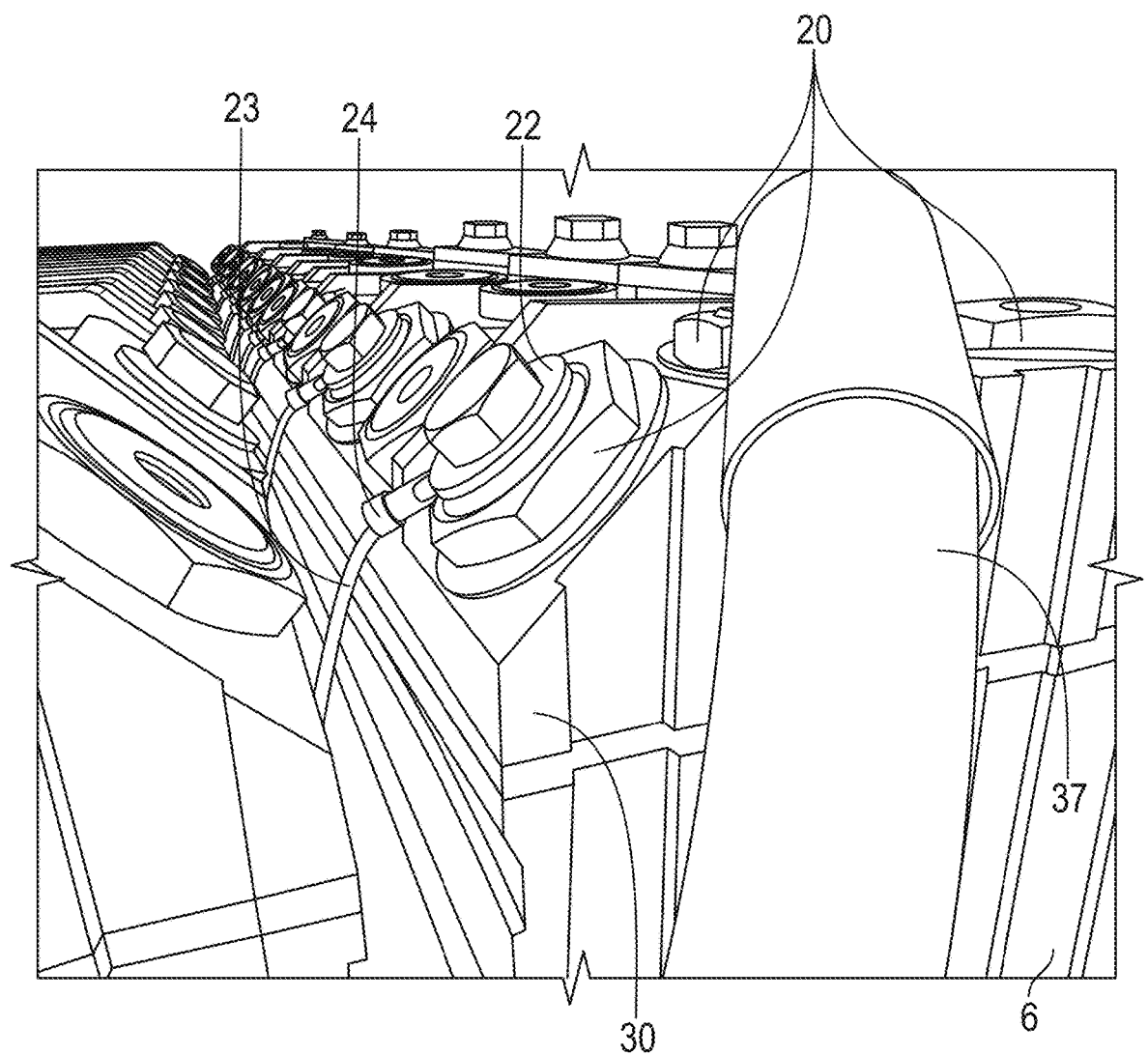
FIG. 2B is an image showing a magnified, right side perspective view of a battery pack.
Figure 2C:
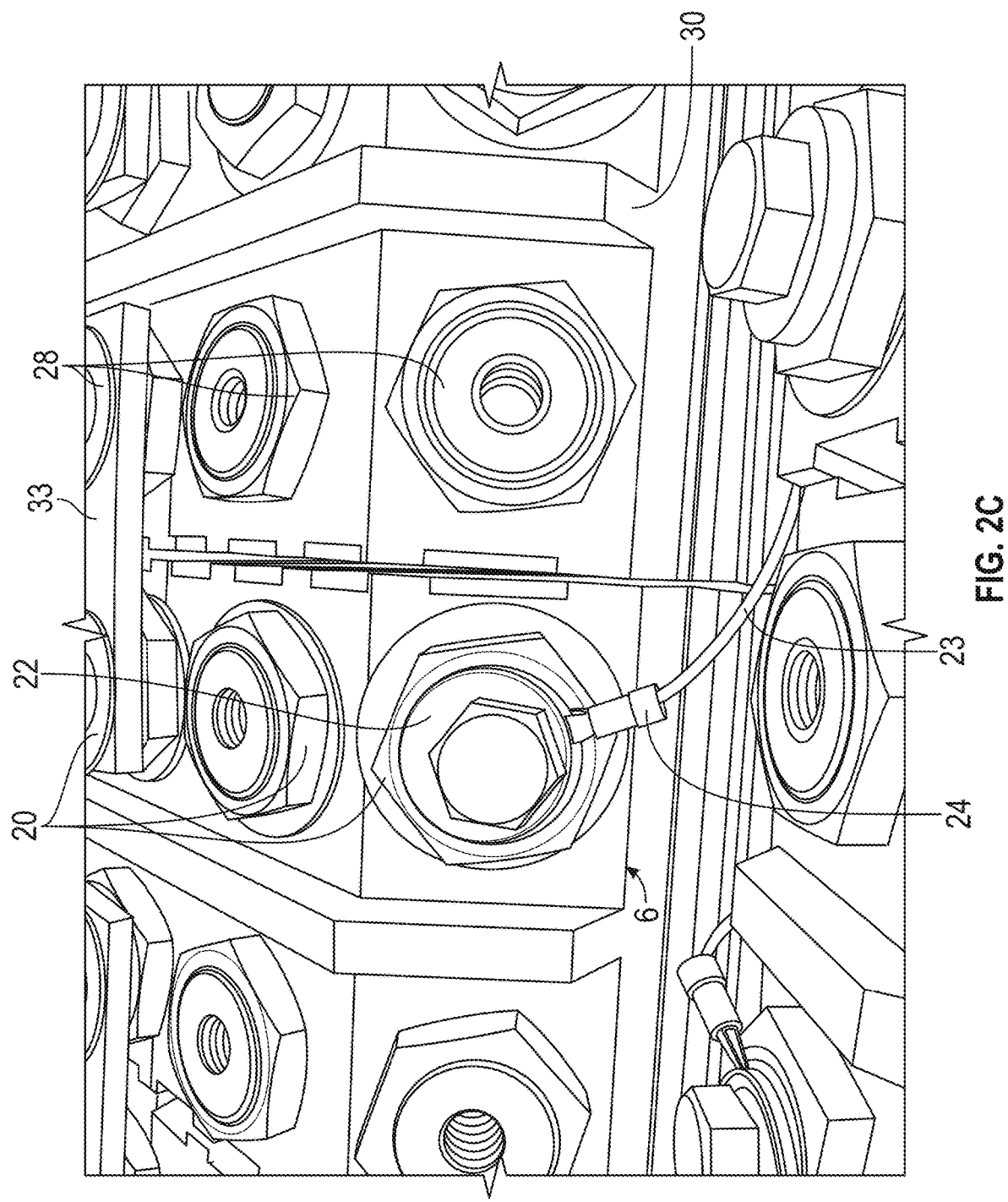
FIG. 2C is an image showing a magnified, front perspective view of a battery pack.

FIG. 2A is an image of at least a portion of an electrical system 1 that includes a plurality of interconnected battery packs 6 to supply electrical power to a load L (not shown). FIG. 2B is an image showing a magnified, right side view of a battery pack 6. FIG. 2C is an image showing a magnified, front perspective view of a battery pack 6. Each battery pack 6 can include one or a plurality of battery cells 2 (see FIG. 3A), with each cell having one or a plurality of positive terminals 20 and one or a plurality of negative terminals 28 (see FIG. 3A). In the example of FIG. 2A, each battery pack 6 can include a plurality of cells with three contact points (e.g., positive or negative terminals) to provide electrical communication to the BMS and/or load L, although any suitable number of contact points or terminals may be provided per battery pack 6. Further, as shown in FIG. 2A, a conductive bus bar 33 can be provided to electrically connect a positive terminal 20 of each battery pack 6 to a negative terminal 28 of an adjacent battery pack 6. An electrical cable 37 can connect to one of the positive terminal 20 as shown in FIG. 2A. The electrical cable 37 can be configured to apply a high voltage to the load L, from the series of battery packs 6. For example, the electrical cable 37 can supply a voltage of at least 500 V to the load L, at least 700 V to the load L, or at least 1,000 V to the load L.

The battery cells 2 (see FIG. 3A) can comprise any suitable type of battery cell, including, but not limited to, lithium ion battery cells. It should be appreciated that each battery pack 6 can include any suitable number of battery cells 2. For example, each battery pack 6 can include at least 100 cells, at least 200 cells, at least 300 cells, at least 400 cells, or at least 500 cells. In one example, each battery pack 6 can include about 500 cells, arranged in ten groups of fifty (50) cells arranged in parallel with one another. Furthermore, it should be appreciated that any suitable number of battery packs 6 can be used in the larger electrical system 1 or system. For example, more than 100 battery packs (e.g., 150 battery packs 6, or 200 battery packs 6) can be used in the system. The electrical system 1 or system can include any suitable type of device for the load L, including but not limited to, an electric or hybrid vehicle, an electric bicycle, electric tools, or any other suitable battery-powered device.

The battery pack 6 in FIGS. 2A-2C can comprise a housing 30 that supports or encloses the battery cells. For example, in various embodiments, the housing 30 can comprise an internal cavity defined by external wall(s) and shaped to receive one or more battery cells 2. The housing 30 can comprise any suitable type of material, such as a plastic material. In some embodiments, as explained above, one or more temperature sensors 21 (such as thermocouples, thermistors, or any other suitable type of sensor) may be mechanically and thermally coupled with the housing 30 at a distance spaced from the terminals in order to avoid shorting, as shown in FIGS. 1 and 2A. The temperature sensors 21 can monitor the temperature of the housing 30, which can be used to correlate to a temperature of the battery cells 2 (which may be different from the measured temperature of the housing 30).

Figure 4:
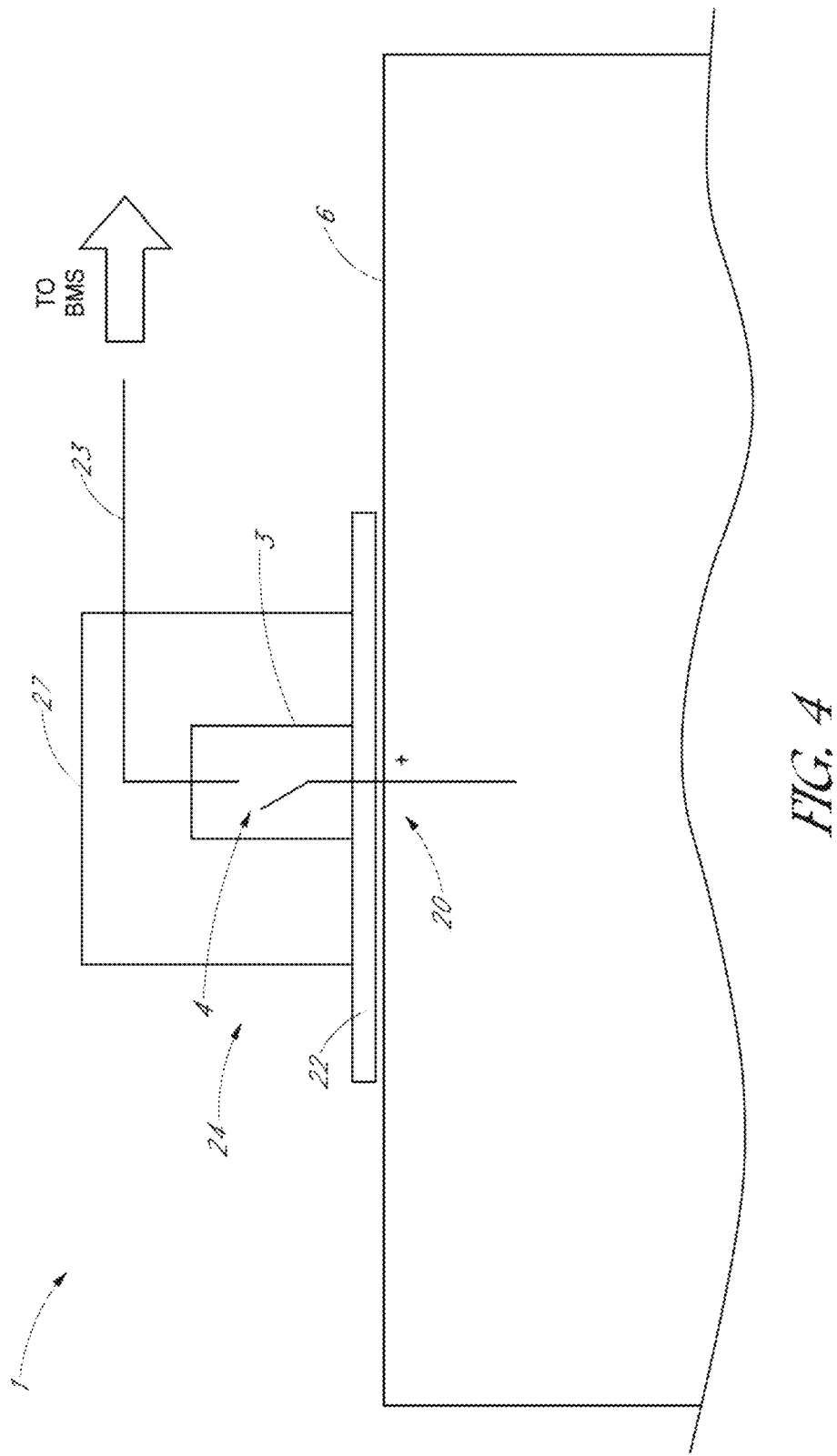
FIG. 4 is an enlarged, schematic diagram of a portion of the electrical system shown in FIG. 3A.

As shown in FIGS. 2A-2C, the positive terminal 20 of each battery pack 6 can electrically and mechanically connect to a status line 23 (e.g., a voltage or current detection line) by way of a connector 24. The connector 24 can comprise any suitable type of electrical connector, such as a conductive clip, a conductive ring, a conductive clamp, etc. For example, as shown in FIGS. 2B-2C and 4, a conductive ring 22 can serve to fasten the connector 24 to the positive terminal 20 of the battery pack 6 to mechanically and electrically connect the status line 23 to the positive terminal 20. Alternatively, in some embodiments, the status line 23 can be attached to the negative terminals 28.

Figure 3A:
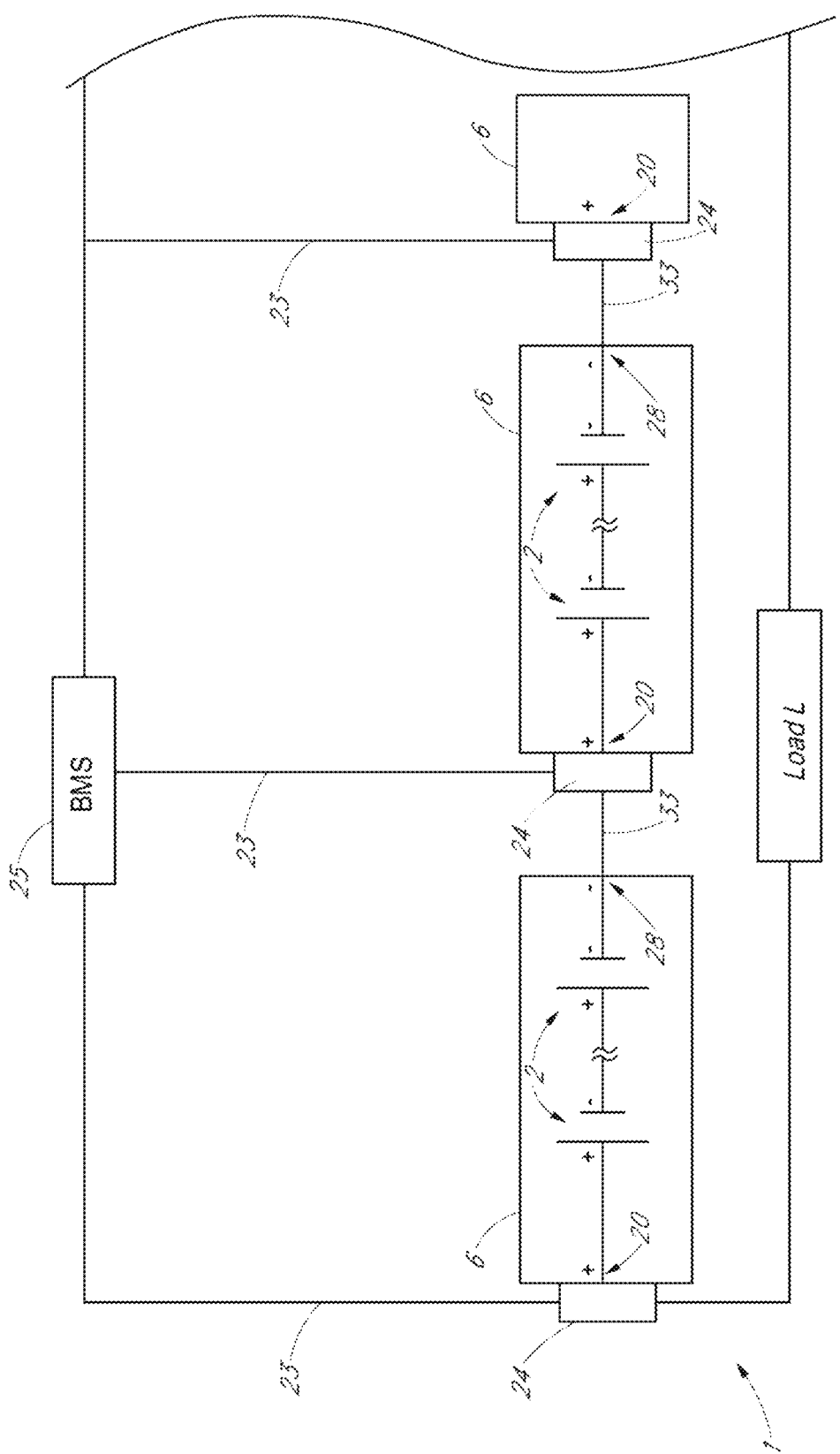
FIG. 3A is a schematic system diagram of a portion of an electrical system, according to one embodiment.
Figure 3B:
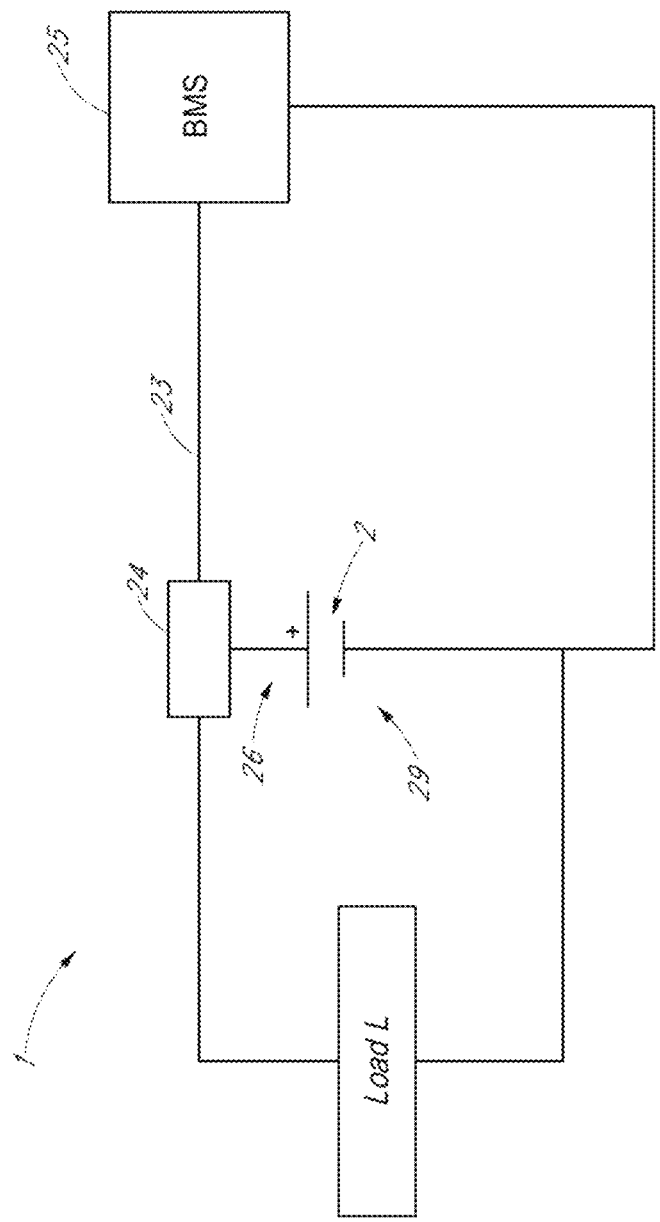
FIG. 3B is a schematic system diagram of an electrical system, according to another embodiment.

The status line 23 can provide electrical communication between the positive terminal 20 of the battery pack 6 and a battery management system (BMS), which is not illustrated in FIGS. 2A-2C (see, for example, FIGS. 3A-3B). The BMS can receive signals from the battery packs 6 along the status line 23 that are indicative of the state of the battery pack 6. For example, the approximate voltage of the battery pack 6 can be provided to the BMS along the status line 23. Thus, in various embodiments, the BMS can be configured to monitor the status of the battery packs 6. The BMS can also transmit electrical power to the battery pack 6 along the status line 23 in order to balance cells 2 that have become unbalanced. In various embodiments, for example, based on the state of charge of each pack 6, the BMS can transmit electrical energy along the status line 23 to balance the charging of the battery packs 6.

In the arrangement of FIGS. 2A-2C, the sensors 21 may not provide a direct, accurate measurement of the temperature of the battery cells 2, because the sensors 21 are mounted to the housing 30, which may comprise a plastic material and by design not good thermal conductors.

As explained herein in connection with FIGS. 3A-4, the connector 24 can beneficially include a thermally activated switch that can monitor the temperature of the battery packs 6 directly at the battery pack 6, e.g., at the positive terminals 20 of the battery packs 6 (or at the negative terminals 28 of the battery packs 6). As explained herein, in various embodiments disclosed herein, the temperature sensors 21 and associated temperature sensing lines 35 can be omitted, which can reduce the costs and complexity of the device 1.

FIG. 3A is a schematic system diagram of a portion of an electrical system 1, according to one embodiment. FIG. 4 is an enlarged, schematic diagram of a portion of the electrical system 1 shown in FIG. 3A. The illustrated portion of the electrical system 1 can supply electrical power to a load L, such as an electric vehicle, an electric bicycle, power tools, etc.

In FIG. 3A, an electrical device comprising a battery management system (BMS) 25 is electrically connected to positive and negative terminals 20, 28 of a battery pack 6, which can include one or more cells 2. Although two cells 2 are illustrated in each battery pack 6 of FIG. 3A, any suitable number of cells can be provided per battery pack 6. The BMS 25 can comprise processing circuitry, including circuitry to define one or more battery management controllers. FIG. 3A illustrates two full battery packs 6 and a portion of a third battery pack; however, as explained above, the BMS 25 can electrically connect to any suitable number of battery packs 6. As explained above, the status line 23 can electrically connect the positive terminal 20 of the battery pack 6 with the BMS 25. Furthermore, a connector 24 can electrically and mechanically connect the status line 23 to the positive terminal 20 of the battery pack 6. As explained above, however, the status line 23 can alternatively connect to the negative terminal 28. As with FIG. 2A, a bus bar 33 can electrically connect the positive terminal 20 of each battery pack 6 to a corresponding negative terminal 28 of an adjacent battery pack 6.

Unlike the arrangement of FIGS. 2A-2C, however, in the embodiment of FIGS. 3A and 4, the connector 24 can include an integrated thermal switching device 3 coupled to or formed within a connector body 27 of the connector 24, as shown in FIG. 4. The connector 24 (e.g., the connector body 27) can comprise an electrical conductor (such as a metal) that electrically and mechanically connects to the status line 23. As shown in FIG. 4, the thermal switching device 3 and the connector body 27 can mechanically and thermally connect to the positive terminal 20 of the battery pack 6 by way of an intervening thermally and electrically conductive ring 22, or by another thermally conductive fastening device. For example, a nut or other fastener can clamp the conductive ring 22 between the connector body 27 and the battery pack 6. Skilled artisans will understand that additional ways of connecting the connector body 27 and switching device 3 to the battery pack 6 may be suitable.

In the embodiment shown in FIGS. 3A and 4, the thermal switching device 3 is disposed physically near to and in thermal connection with the positive terminal 20 of the battery pack 6 and with the cells 2 of the battery pack 6. Indeed, as shown in FIG. 4, the thermal switching device 3 can be in physical contact with the terminal 20 of the battery pack 6 by way of an intervening thermally conductive ring 22 or other thermally conductive fastening device. In some embodiments, a thermal adhesive may also be provided between the thermal switching device 3 and the ring 22, and/or between the ring 22 and the terminal 20. Accordingly, as shown in FIG. 4, a short, thermally conductive pathway is provided directly between the thermal switching device 3 and the terminal 20 of the battery pack 6. Such a thermally conductive pathway can enable thermal energy (e.g., heat) to be transferred efficiently from the battery pack 6 (and cells 2) to the thermal switching device 3.

The thermal switching device 3 can comprise a switch 4, such as a thermally-activated switch, configured to move from a normally closed condition to an open condition when a temperature of the battery cells 2 exceeds a characteristic temperature threshold. The thermal switching device 3 can serve as a thermal fuse and/or a thermal cut off (TCO) device. The switch 4 can be configured to remain in the normally closed condition when the temperature of the battery cells 2 is less than the temperature threshold. In the normally closed condition, cell balancing can be performed and one or more status signals from the battery pack 6 can be conveyed to, and monitored by, the BMS 25. Thus, by receiving and processing the signals received from the battery pack 6 along the status line 23, the BMS 25 can determine that the battery pack 6 is operating under normal conditions at temperatures less than the threshold.

In the example of FIGS. 3A and 4, the electrical device that monitors the temperature condition of the battery packs 6 comprises a BMS, but in other embodiments, the electrical device may comprise a motor, a transformer, a housing of an electrical component, or other suitable electrical device in which it is important to maintain a temperature of a battery pack 6 or cell below a predetermined threshold temperature. In some embodiments, the connector 24 can connect to a plurality of (e.g., two) electrical or status lines, and tripping of the thermal switching device 3 can create an open circuit in the plurality of status lines to indicate an overtemperature condition.

During operation, therefore, thermal energy from the battery pack 6 can be transferred along the short, thermally conductive pathway to the thermal switching device 3 with little or no thermal losses. If the temperature of the battery pack 6 (and/or its individual cells 2) is less than the threshold temperature, then the switch 4 can remain closed, and the BMS 25 (or other electrical device) receives the status signal from the battery pack 6 and can determine that the battery pack 6 is operating normally. However, if the temperature of the battery pack 6 exceeds the predetermined temperature, then the switch 4 can move to the open condition, interrupting the signal to the BMS 25 along the status line 23. The BMS 25 can determine that the signal has been interrupted and can indicate to the user that the battery pack 6 may have experienced an overtemperature condition. Furthermore, opening the switch 4 can cause the BMS to initiate processes to interrupt the circuit between the electrical load L and a portion or all of the battery pack 6 that is experiencing the overtemperature condition, which may beneficially prevent the temperature from increasing any further so as to protect the battery pack 6 and the larger electrical system 1.

For example, in some embodiments, the switch 4 can open in response to an increase in temperature, which can send a signal to the BMS 25 created by a change in resistance, for example, an abrupt increase in resistance. In various embodiments, the current along the status line 23 can abruptly be reduced. For example, in some embodiments, an analog-to-digital converter (ADC) within the BMS 25 can be programmed to calculate a drop in voltage based on an increase in resistance in, for example, a PTC resistor or other element of the switch 4 in which resistance increases with increasing temperature. The BMS 25 can be programmed to interpret the change in current and/or resistance as a drop in voltage and, accordingly, as an alert or alarm signal indicating that the monitored cell(s) has exceeded a threshold. In response to the overtemperature alarm, the BMS 25 can send instructions that shut down some or all of the cells 2 in the battery pack 6.

In some embodiments, the switch 4 can be configured to be non-resettable, such that, if the switch 4 is flipped or tripped to the open condition from the normally closed condition, the switch 4 remains in the open condition. In such an arrangement, when the switch 4 is opened, the status signal regarding the voltage sent to the BMS 25, as well as the cell balancing function, may be permanently interrupted, and based on that interruption, the BMS 25 can determine that the battery pack 6 is in an overtemperature fault condition. In some cases, the user may elect to replace the battery pack 6 that experienced the overtemperature fault condition. In other embodiments, the switch 4 can be manually resettable. For example, if the switch 4 is flipped or tripped to the open condition, the BMS 25 can indicate to the user that the signal along the status line 23 has been interrupted, which may indicate an overtemperature condition. The user can inspect the battery pack 6 and if the temperature drops sufficiently, or if the overtemperature condition is otherwise addressed, the user can reset the switch 4 to the normally closed condition, for example, by pressing a button or engaging another interface.

In still other embodiments, the switch 4 can be automatically resettable, as explained below in connection with FIGS. 5A-8. In some embodiments, as shown in FIGS. 5A-6B, the switch 4 can comprise a thermal switching element in parallel with a positive temperature coefficient (PTC) resistor, or various combinations of PTCs, thermal cutoffs (TCOs), and/or thermal fuses disposed in parallel or in series. In other embodiments, the switch 4 may not include a PTC resistor. The switch 4 can have hysteresis properties (see, e.g., FIG. 8) that enable the switch 4 to move from the normally closed condition to the open condition when the temperature exceeds a characteristic threshold, and to move back to the normally closed condition from the open condition once the temperature falls below a reset threshold. In such arrangements, the signal from the battery pack 6 along the status line 23 may be intermittently or temporarily interrupted to the BMS 25. When the signal is interrupted, the BMS 25 can determine that the battery pack 6 is in an overtemperature condition and can indicate the overtemperature condition to the user. If the temperature drops sufficiently, the switch 4 may move back to the normally closed condition, and the voltage signal to the BMS 25 and cell balancing function can be restored. The BMS 25 can accordingly determine that the overtemperature condition has subsided and that the battery pack 6 is operating normally.

Beneficially, the embodiment of FIGS. 3A and 4 can provide a more accurate determination of whether the temperature of the battery pack 6 and its cells 2 is excessive than the temperature sensors 21 shown in FIGS. 1A-2C. In the arrangement of FIGS. 1A-2C, for example, the sensors 21 typically detect the temperature of the housing 30, and do not include a direct thermally conductive pathway to the battery pack 6 and its cells. By contrast, in the embodiment of FIGS. 3A and 4, the thermal switching device 3 is integrated with the connector 24 and is disposed near, and in close thermal communication with, the terminal 20 of the battery pack 6. The temperature of the thermal switching device 3 therefore more closely approximates the temperature of the battery pack 6, due at least in part to the close thermal proximity of the thermal switching device 3 and the battery pack 6. Moreover, the use of a thermal switching device 3 can beneficially open (and in some embodiments close) the switch 4 so as to directly communicate the condition of the battery pack 6 to the BMS 25, e.g., whether or not the battery pack 6 is in a normal operating condition or an overtemperature fault condition. For example, as explained above, the opening of the thermal switching device 3 can send a signal to the BMS 25 that is caused by a change in resistance (e.g., an abrupt increase in resistance), which can serve as an alarm representative of an overtemperature condition. In some embodiments, the use of the switching device 3 integrated with the connector body 27 can obviate the use of a separate temperature sensor, such as the sensors 21 described in connection with FIGS. 1A-2C, or provide an overtemperature interruption of status line 23, which is independent of any such sensors. Moreover, as explained above, the cable 37 can provide high voltage power to the load L. The thermal switching device 3 can be configured to withstand high voltages, including voltages of at least 500 V, at least 750 V, or at least 1000 V. For example, the thermal switching device 3 can withstand voltages within a range of 1 V to 2000 V, or within 100 V to 1500 V.

FIG. 3B is a schematic system diagram of an electrical system 1, according to another embodiment. Unless otherwise noted, the components of FIG. 3B may be the same as or generally similar to like-numbered components of FIGS. 3A and 4. For example, as with the embodiment of FIGS. 3A and 4, a connector 24 can be provided. As with FIG. 4, the connector 4 can include a thermal switching element 3 as explained above. Unlike the embodiment of FIGS. 3A and 4, instead of connecting to multiple battery packs 6 with a plurality of cells 2, in the embodiment of FIG. 3B the connector 24 can connect to a positive terminal 26 of an individual battery cell 2. The BMS 25 (or other electrical device, as explained above) can electrically connect to the positive terminal 26 and a negative terminal 29 of the battery cell 2. As shown in FIG. 4, the status line 23 can provide electrical communication between the connector 24 and the BMS 25. As with the embodiment of FIGS. 3A and 4, the embodiment of FIG. 3B can similarly monitor a temperature of a battery cell 2. If the temperature of the cell 2 exceeds a predetermined threshold, then the switch 4 can open and the signal to the BMS 25 can be interrupted. Moreover, as explained above, the switch 4 can be configured to be non-resettable, manually resettable, or automatically resettable.

FIGS. 5A-8 illustrate various embodiments in which the switching device 3 is automatically resettable. As explained above, however, in other embodiments, the switching device 3 may be non-resettable or manually resettable. FIG. 5A is a schematic side sectional view of a thermal switching device 3 in a normal operating condition, according to various embodiments. FIG. 5B is a schematic circuit diagram of the thermal switching device 3 shown in FIG. 5A. FIG. 6A is a schematic side sectional view of the thermal switching device 3 of FIG. 5A in a fault condition. FIG. 6B is a schematic circuit diagram of the thermal switching device 3 shown in FIG. 6A. The thermal switching device 3 can comprise a switch 4 connected with a positive temperature coefficient (PTC) resistor 5. In the embodiment of FIGS. 5A-6B, for example, the switch 4 is connected in parallel with the PTC resistor 5, but in other embodiments, the PTC resistor 5 may be connected in other configurations. In still other embodiments, there may be no PTC resistor 5 or parallel electrical pathway.

In the illustrated embodiment, the switch 4 is a thermally-activated mechanical switch in particular a bimetal element. As explained herein, the PTC resistor 5 can comprise a resistive element with a resistance that increases with increasing temperature. The PTC resistor 5 can be any suitable type of PTC resistor, including a ceramic PTC resistor or a polymeric PTC resistor. As shown in FIGS. 5A and 6A, the thermal switching device 3 can comprise an electromechanical device comprising a housing 10 to which a first terminal T1 and a second terminal T2 are coupled. The housing 10 can comprise a first conductive line 12 electrically connected to the second terminal T2 and to a PTC resistor 5 by way of one or more interconnects 13.

The switch 4 can comprise a movable (e.g., pivotable or bendable) conductive arm 8 and a switching element 7. The pivotable arm 8 can electrically connect to the first terminal T1 and to the switching element 7 by contact. For example, in the normal condition shown in FIG. 5A, the pivotable arm 8 can electrically contact a central portion of the switching element 7. For example, in FIG. 5A, the pivotable arm 8 is shown in a normal condition in which a contact 15 on a distal end portion of the pivotable arm 8 contacts and is electrically connected to the first conductive line 12 and the second terminal T2. In FIG. 6A, the pivotable arm 8 is shown in a fault condition in which the pivotable arm 8 is disconnected from the second terminal T2 and in an open electrical configuration. In the fault condition, the pivotable arm 8 can also electrically contact the switching element 7 at opposing end portions of the switching element 7.

The pivotable arm 8 can move from the normal condition to the fault condition by engaging with the switching element 7 and the PTC resistor 5. For example, the switching element 7 can comprise an electromechanical or thermomechanical switching element, particularly a dome-shaped bimetal element, such as a disc having different metals on different sides, which changes shape in response to temperature changes. During normal operation, as shown in FIGS. 5A and 5B, a first current $I_1$ can flow along the pivotable arm 8. Most of the current $I_2$ passes through the second terminal T2, the first conductive line 12, and the pivotable arm 8 without passing through the PTC resistor 5. However, a small trickle current $I_3$ (shown in dashed lines) passes from the second terminal T2 and the first conductive line 12 to the pivotable arm 8 through the PTC resistor 5 and the switching element 7. As explained above, during normal operation, the current $I_2$ that bypasses the PTC resistor 5 may be much greater than the trickle current $I_3$ through the PTC resistor 5.

If the temperature and/or current through the thermal switching device 3 exceeds threshold values, then the thermal switching device 3 can move from the normal operating condition shown in FIGS. 5A-5B to the fault condition shown in FIGS. 6A-6B. For example, if the temperature of the switching element 7 exceeds a particular temperature threshold, which can be selected and tuned in the manufacturing process, such as by material and dimensional choices, then the switching element 7 can switch from the downwardly-curving shape of FIG. 5A to the upwardly-curving shape of FIG. 6A. The PTC resistor 5 can also increase the temperature of the switching element 7, as increasing currents through the PTC resistor 5 cause increases in temperature of the PTC resistor 5 and the switching element 7, which contacts the PTC resistor 5. The correspondence between resistance and temperature may be non-linear as shown, e.g., in FIG. 8, in which at a threshold temperature (or range of temperatures) the resistance may increase significantly so as to cause a higher temperature increase. When the switching element 7 changes shape to the upwardly-curving shape shown in FIG. 6A, the switching element 7 can move the pivotable arm 8 to an open configuration. Although the switching element 7 is shown as downwardly-curving in the normal condition and upwardly-curving in the fault condition, it should be appreciated that in other arrangements the thermal switching device may also be configured such that the switching element 7 is in an upwardly-curving shape during normal operating conditions and in a downwardly-curving shape during a fault condition.

During a fault configuration, the increased temperature of the PTC resistor 5 accordingly increases the resistance and decreases the current flow through the thermal switching device 3. As explained in additional detail below with respect to FIG. 8, a trickle current $I_3$ can provide a small amount of current from the battery pack or cell to enable essential device functionality, because the heat generated by the PTC resistor 5 maintains high temperatures after the initial fault condition to prevent the switch 4 from chattering, i.e., from repeatedly switching between the fault mode and the normal operating mode. Thus, in some embodiments, if chatter is problematic for the switching device, then the PTC resistor 5 may be used. In other embodiments, if chatter is not a problem, then the PTC resistor may be omitted, e.g., the design of the bimetallic disc can be adjusted so as to obviate the use of a PTC resistor. The skilled artisan will appreciate that the trickle currents $I_3$ through the PTC resistor 5 can have different magnitudes under normal and fault conditions, and that the magnitude of $I_3$ can change during the advent of a fault condition.

Figure 7:
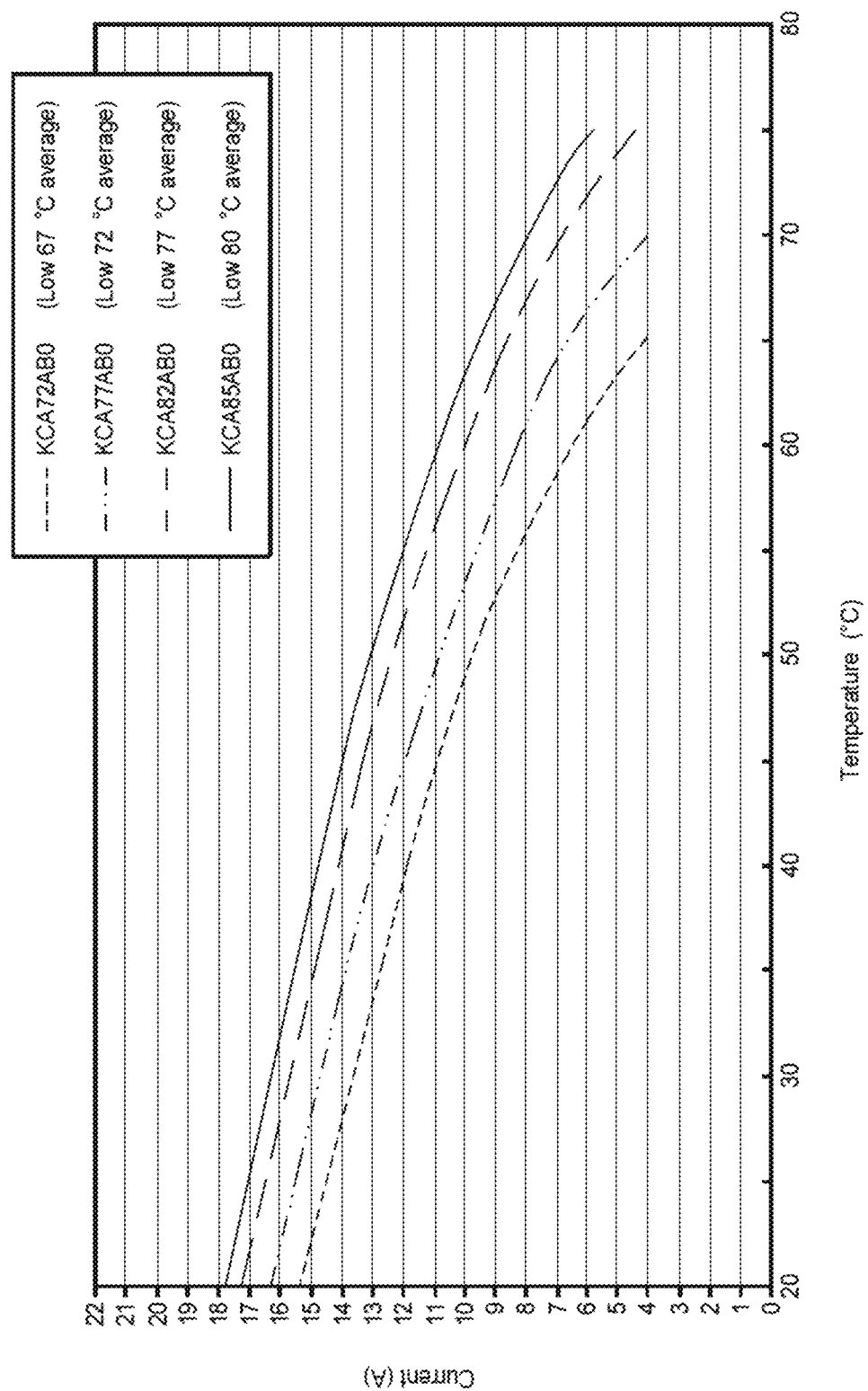
FIG. 7 is a graph that shows the current and temperature at which exemplary switches trip from a normal operating condition to a fault condition, according to various embodiments.

FIG. 7 is a graph that shows the current and temperature at which exemplary switches 4 trip from a normal operating condition to a fault condition, according to various embodiments. In particular, FIG. 7 is a plot of current versus temperature for dome-shaped bimetal switches used in Komatsulite™ KCA Series A-Type Breakers, commercially available from Bourns, Inc., of Riverside, Calif. In particular, FIG. 7 plots the current versus temperature for four different versions of the Series A-Type Breakers. In FIG. 7, the line represents the temperature and current combination at which the particular breaker trips to the fault condition. Thus, the region below each line indicates a normal condition and the region at the line and above indicates a fault condition. As shown in FIG. 7, the switch 4 can trip from the normal operating condition to the fault condition at relatively high temperatures (even at low currents) and/or at relatively high currents (even at low temperatures). For example, the switch 4 can trip from the normal operating condition to the fault condition when the switch 4 reaches a preset threshold temperature in a range of 65° C. to 85° C., or more particularly, in a range of 70° C. to 80° C., depending upon the design.

The use of the PTC resistor 5 can provide various advantages in some embodiments. As explained herein, the PTC resistor 5 can enable the switch 4 and thermal switching device 3 to operate in a stable manner, such that the thermal switching device 3 does not chatter at a high rate between the normal condition and the fault condition by maintaining an elevated temperature after an initial fault condition. Instead, due to hysteresis behavior, a significant reduction in the temperature of the switching device 3 is entailed for before resetting the thermal switching device 3 from the fault condition to the normal operating condition under some circumstances.

Figure 8:
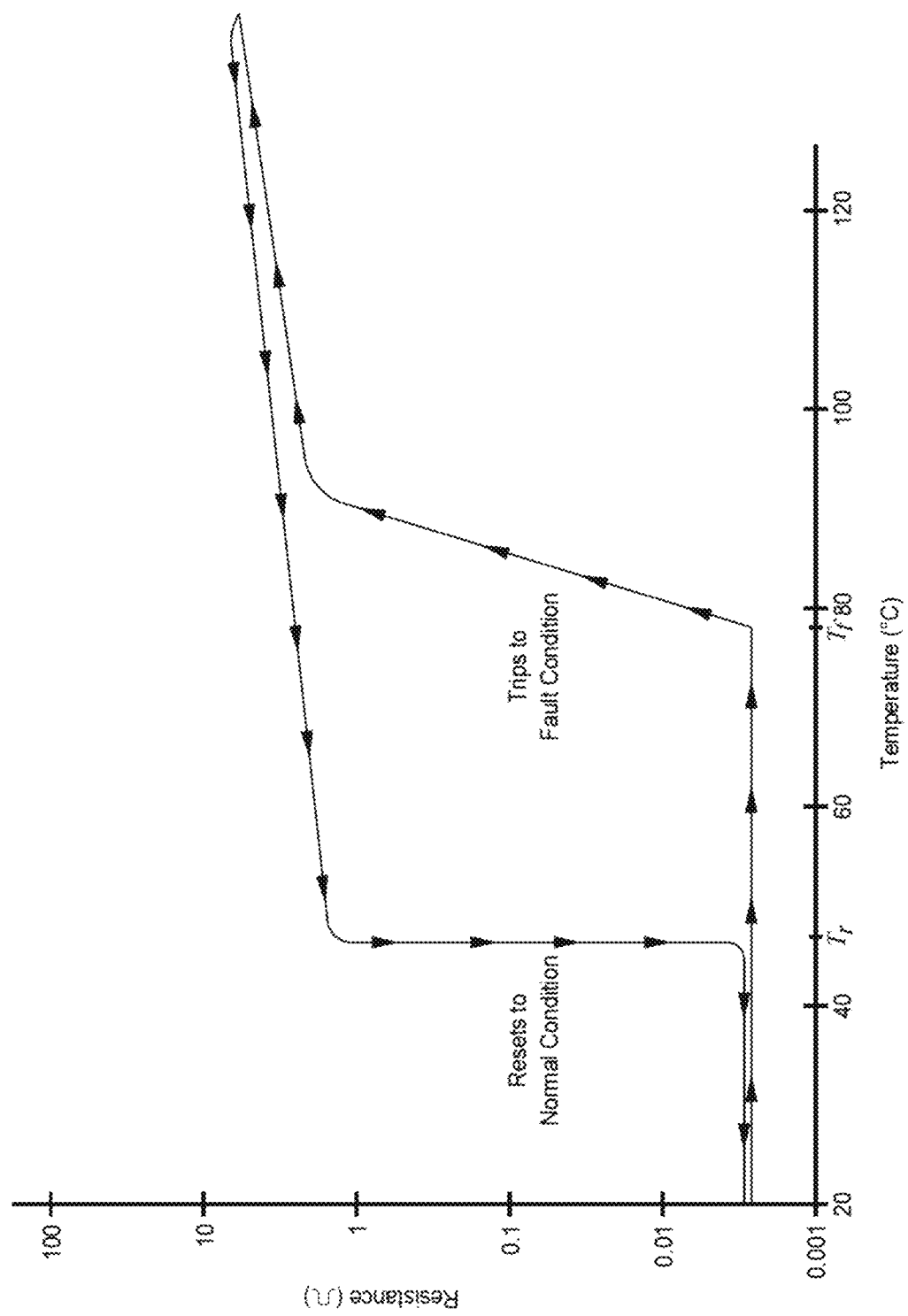
FIG. 8 is a schematic graph that shows the relationship between temperature and resistance of an exemplary positive temperature coefficient (PTC) resistor, according to various embodiments.

FIG. 8 is a schematic graph that shows the relationship between temperature and resistance of an exemplary PTC resistor, according to various embodiments. For example, as shown in FIG. 8, at temperatures below a predetermined fault temperature $T_f$, the resistance $R_{PTC}$ of the PTC resistor 5 can be at a relatively low level (but can be higher than the resistance $R_S$ of the switch 4). As the temperature of the PTC resistor 5 reaches the predetermined fault temperature $T_f$, the resistance $R_{PTC}$ can increase significantly with increasing temperature. In the thermal switching device 3 of FIGS. 5A-6B, the increasing temperature of the PTC resistor 5 can further increase the temperature of the switching element 7 that contacts the PTC resistor 5. Thus, the increasing temperature of the PTC resistor 5 can accelerate or otherwise assist in causing the switching element 7 to change shape and trip to the fault condition shown in FIGS. 6A-6B, providing a faster reaction time for a thermomechanical switch.

Advantageously, the hysteresis shown in FIG. 8 can prevent the thermal switching device 3 from operating in a chatter mode. In a chatter mode, without the hysteresis shown in FIG. 8, as the temperature decreases (even slightly), the temperature of the bimetallic switching element 7 would decrease and switch back into the normal operating condition prematurely. The increasing current of the operating condition would again increase the temperature of the switching element 7 past the fault temperature $T_f$, and the breaker might repeatedly switch from normal operating condition to fault condition, and back again. Such a chattering mode is undesirable and can lead to instability in the larger electrical system or device 1.

Thus, the thermal switching device 3 of FIGS. 5A-6B can advantageously employ a PTC resistor 5 connected with the switch 4 (for example, in parallel) to maintain stable operating and fault conditions. The thermal switching device 3 of FIGS. 5A-6B can advantageously be resettable in some arrangements, such that the breaker 3 can return to the normal operating condition if the fault condition subsides (for example, by a sufficient decrease in current and/or temperature). Furthermore, as explained herein, the thermal switching device 3 can stably move to the fault condition and back to the normal operating condition without chattering.

In other embodiments, as explained above, the thermal switching device 3 can be manually resettable or not resettable at all. In such embodiments, for example, there may be no PTC resistor in the thermal switching device 3 and no electrical pathway in parallel with the switch 4. In such arrangements, if the switch 4 trips in a fault condition, then the switch 4 may remain permanently in the open configuration to prevent current from flowing to and from the BMS. In some embodiments, the thermal switching device 3 can comprise a button or other manual user interface to enable the user to manually reset the thermal switching device 3 into the normal operating configuration. Still other arrangements for the thermal switching device 3 may be suitable.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A temperature-sensitive battery connector, comprising:
a connector body configured to mechanically connect to a terminal of a battery cell;
at least one conductor mounted to the connector body and configured to convey a signal from a battery pack or battery cell to an electrical device; and
a thermal switching device mounted to the connector body to thermally couple to a terminal of a battery pack or a battery cell, the thermal switching device configured to provide an overtemperature signal to the electrical device by modifying the signal conveyed by the at least one conductor when a temperature of the battery pack or battery cell exceeds a predetermined threshold temperature.

2. The temperature-sensitive battery connector defined in claim 1, wherein the electrical device comprises a battery management system (BMS).

3. The temperature-sensitive battery connector defined in claim 1, wherein, when the temperature of the battery pack or battery cell is less than the predetermined threshold temperature, the signal conveyed by the at least one conductor to the electrical device comprises a voltage status signal.

4. The temperature-sensitive battery connector defined in claim 1, wherein the modified signal is a change in current through the at least one conductor.

5. The temperature-sensitive battery connector defined in claim 4, wherein the thermal switching device is configured to provide the overtemperature signal to the electrical device by changing the current through the at least one conductor.

6. The temperature-sensitive battery connector defined in claim 1, wherein the modified signal is caused by a change in resistance of at least one component of the thermal switching device.

7. The temperature-sensitive battery connector defined in claim 1, wherein the thermal switching device is configured to provide a normal-temperature signal to the device by conveying the signal from the at least one conductor to the device when the temperature of the battery pack is below a threshold temperature.

8. The temperature-sensitive battery connector defined in claim 1, wherein the thermal switching device is as a thermal fuse or thermal cut off (TCO) device.

9. The temperature-sensitive battery connector defined in claim 1, wherein the thermal switching device is non-resettable.

10. The temperature-sensitive battery connector defined in claim 1, wherein the thermal switching device is manually resettable.

11. The temperature-sensitive battery connector defined in claim 10, further comprising a user interface to manually reset the thermal switching device when engaged by a user.

12. The temperature-sensitive battery connector defined in claim 1, wherein the thermal switching device is automatically resettable.

13. The temperature-sensitive battery connector defined in claim 12, wherein the thermal switching device comprises a thermally-activated switching element and a positive temperature coefficient (PTC) resistor in parallel with the thermally-activated switching element, and wherein the modified signal is indicative of a change in resistance of the PTC in parallel with the thermally-activated switching element.

14. The temperature-sensitive battery connector defined in claim 13, wherein the thermally-activated switching element comprises a bimetallic dome-shaped switching element.

15. The temperature-sensitive battery connector defined in claim 1, further comprising a conductive ring to mechanically and thermally connect the connector body to the terminal of the battery pack or battery cell.

16. An electrical system comprising:
a plurality of battery packs;
a battery management system (BMS) for managing the plurality of battery packs, each battery pack of the plurality of battery packs having at least one battery terminal, the BMS comprising:
a battery management controller; and
a plurality of status lines, wherein the battery management controller is configured to monitor a status of the battery packs through the status lines and wherein each status line of the plurality of status lines comprises:
a connector configured to couple to the battery terminal of a respective one of the battery packs;
at least one conductor mounted to the connector and coupling the connector to the battery management controller; and
a thermal switching device mounted to the connector, wherein the thermal switching device thermally couples to the battery terminal of the respective one of the battery packs, wherein the thermal switching device modifies a signal to the battery management controller from the battery terminal of the respective one of the battery packs when a temperature of the respective one of the battery packs exceeds a predetermined threshold temperature.

17. The electrical system defined in claim 16, wherein the battery management controller is configured to sense that at least one of the battery packs is at a temperature exceeding the predetermined threshold temperature based on a detection of an open circuit condition on at least one of the status lines.

18. The electrical system defined in claim 16, wherein the thermal switching device in each status line is integrated with the connector of each respective status line.

19. The electrical system defined in claim 16, wherein the thermal switching device is a thermal fuse or thermal cut off (TCO) device.

20. The electrical system defined in claim 16, wherein the thermal switching device is non-resettable.

21. The electrical system defined in claim 16, wherein the thermal switching device is manually resettable.

22. The electrical system defined in claim 21, further comprising a user interface to manually reset the thermal switching device when engaged by a user.

23. The electrical system defined in claim 16, wherein the thermal switching device is automatically resettable.

24. The electrical system defined in claim 23, wherein the thermal switching device comprises a thermally-activated switching element and a positive temperature coefficient (PTC) resistor in parallel with the thermally-activated switching element.

25. The electrical system defined in claim 24, wherein the thermally-activated switching element comprises a bimetallic dome-shaped switching element.

26. The electrical system defined in claim 16, further comprising a conductive ring to mechanically and thermally connect the connector body to the terminal of the battery pack or battery cell.

* * * * *